United States Patent [19]
Baker et al.

[11] Patent Number: 4,992,023
[45] Date of Patent: Feb. 12, 1991

[54] VEHICLE WATER PUMP WITH IMPROVED SLINGER

[75] Inventors: Steven F. Baker, Bellevue; Joseph L. Tengowski; Brent R. Behrman, both of Norwalk, all of Ohio

[73] Assignee: General Motors Corporation, Detroit, Mich.

[21] Appl. No.: 548,651

[22] Filed: Jul. 5, 1990

[51] Int. Cl.$^5$ .................. F01D 11/00; F16J 15/00
[52] U.S. Cl. .................. 415/171.1; 415/174.3; 415/231; 277/67; 277/68; 384/135; 384/478
[58] Field of Search .................. 415/170.1, 171.1, 229, 415/230, 231, 168.1, 168.2, 169.1, 208.1, 174.2, 174.3, 121.2; 277/24, 67, 68, 133; 384/135, 478; 417/366, 368

[56] References Cited
U.S. PATENT DOCUMENTS

| | | | |
|---|---|---|---|
| 2,737,120 | 3/1956 | Ivanoff et al. | 417/366 |
| 3,549,277 | 12/1970 | Kiss et al. | 415/168.2 |
| 3,608,910 | 9/1971 | Tyler | 415/231 |
| 3,981,610 | 9/1976 | Ernst et al. | 415/291 C |
| 4,380,416 | 4/1983 | Menager | 415/168.2 |
| 4,389,052 | 6/1983 | Shimizo et al. | 277/68 |
| 4,402,515 | 9/1983 | Malott | 277/67 |
| 4,768,923 | 9/1988 | Baker | 415/170 A |

Primary Examiner—Edward K. Look
Assistant Examiner—Hoang Nguyen
Attorney, Agent, or Firm—Patrick M. Griffin

[57] ABSTRACT

A slinger ring for a vehicle water pump shaft is given a scalloped outer lip, which causes the lip to undulate back and forth past vent holes in the bearing race as the pump shaft rotates. This provides a continual vent hole cleaning and scraping action.

2 Claims, 2 Drawing Sheets

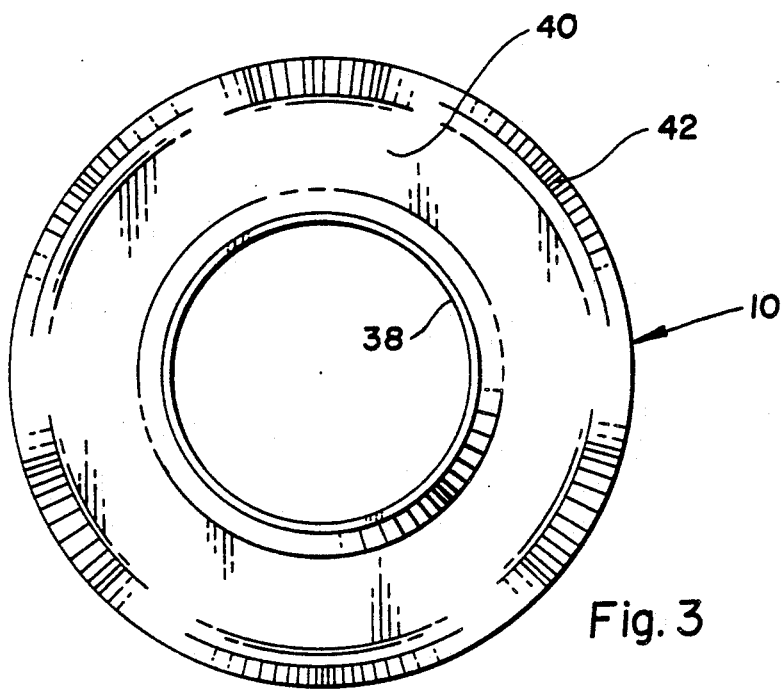
Fig. 3
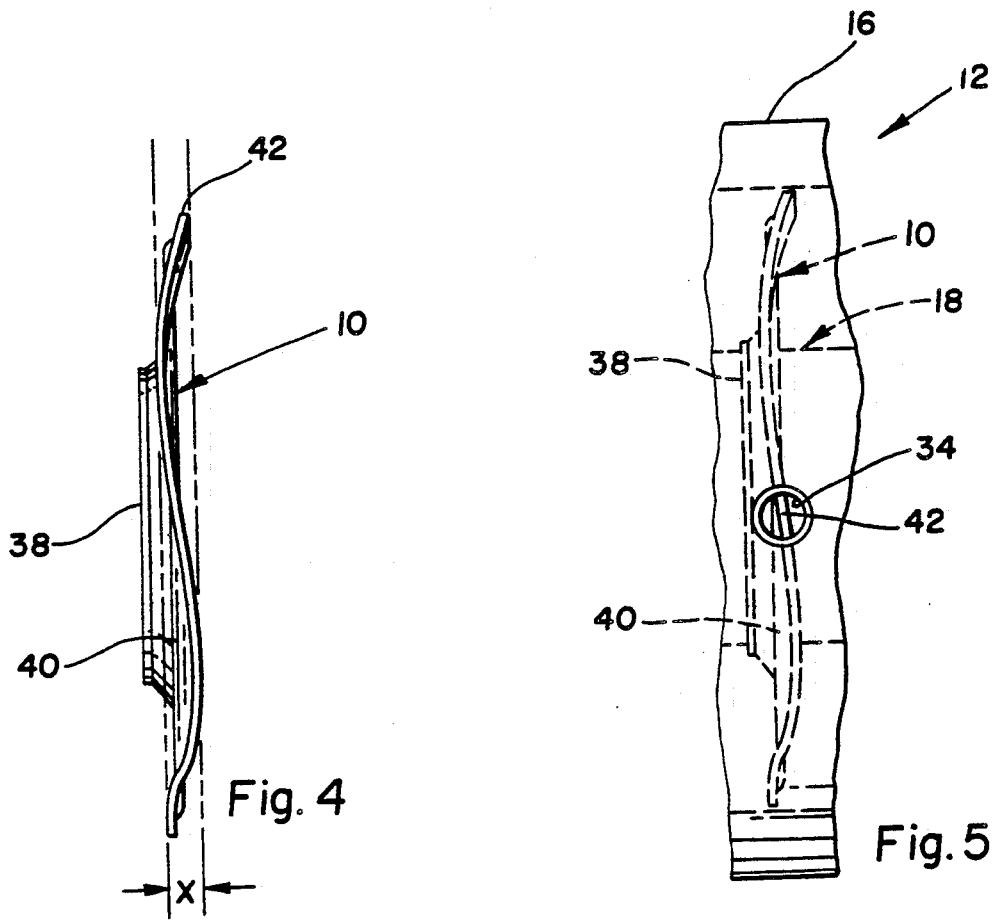
Fig. 4
Fig. 5

VEHICLE WATER PUMP WITH IMPROVED SLINGER

This invention relates to vehicle water pumps in general, and specifically to a water pump with an improved slinger.

BACKGROUND OF THE INVENTION

Vehicle water pumps have a rapidly rotating pump shaft with an impeller mounted to the inner end and a pulley at the outer end. The pump shaft extends through a cylindrical housing, where it is supported by a bearing, and is surrounded by a spring loaded face seal that retains coolant in the pump housing. However, such seals often leak a small amount of coolant. It is generally desired not to let the stray coolant collect, as it might reach the pump shaft bearing. Therefore, vent holes, often called weep holes, are provided in the housing to let leaking coolant continually escape. Some designs also provide a slinger ring on the pump shaft, which is intended to fling stray coolant toward the vent holes, assisting its escape. However, if the vent holes become clogged by outside contaminants, their venting function may be jeopardized, requiring that they be cleaned out.

SUMMARY OF THE INVENTION

The invention provides a vehicle water pump with a improved slinger designed both to fling stray coolant out of the vent holes and to automatically keep potential clogs scraped away from the vent holes.

The invention is incorporated in a vehicle water pump having a block mounted pump housing and a cylindrical bearing race that protrudes from the front of the pump housing. A pump shaft runs centrally through the bearing race, supported by a double complement of sealed bearing balls. The shaft passes through a water pump seal before entering the bearing race, and an intermediate chamber is thereby created between the water pump seal and the closest bearing seal. Any coolant leaking past the water pump seal would flow first into the intermediate chamber.

In order to allow stray coolant to escape before bearing balls, a pair of vent holes are drilled through the bearing race and into the intermediate chamber. The slinger made according to the invention is basically an annular disk, with an inner diameter that allows it to be tightly press fitted to the pump shaft in axial alignment with the vent holes. Unlike conventional slingers, however, it is not flat. Instead, it is stamped with a scalloped or wavy outer lip that curves from one side to the other of the slinger. The radius of the outer lip also brings it close to the inner surface of the bearing race, close to the vent holes. As the shaft rotates, the outer lip moves axially back and forth past the vent holes, creating a scraping action to clean away contaminants that could otherwise clog them. The centrifugal action of the spinning disc still acts to fling stray coolant out of the vent holes, as well, and even adds an axial component to the spray.

It is, therefore, a general object of the invention to provide a vehicle water pump which acts to automatically prevent its vent holes from becoming obstructed.

It is another object of the invention to provide such a water pump with a slinger that will provide the vent hole cleaning function as well as centrifugally assisting stray coolant out of the vent holes.

It is another object of the invention to provide the cleaning function by scalloping the outer lip of the slinger in the axial direction, and by giving it a close radial clearance from the vent holes, so that it will move axially back and forth past, and radially close to, the vent holes as the pump shaft rotates.

BRIEF DESCRIPTION OF THE DRAWINGS

These and other objects and features of the invention will appear from the following written description, and from the drawings, in which:

FIG. 3 is a plan view of the slinger of the invention alone;

FIG. 4 is a side view of the slinger alone;

FIG. 5 is a view of a portion of the bearing race looking radially into a vent hole, and showing the location of the slinger ring in dotted lines.

DESCRIPTION OF THE PREFERRED EMBODIMENT

Figure 1:
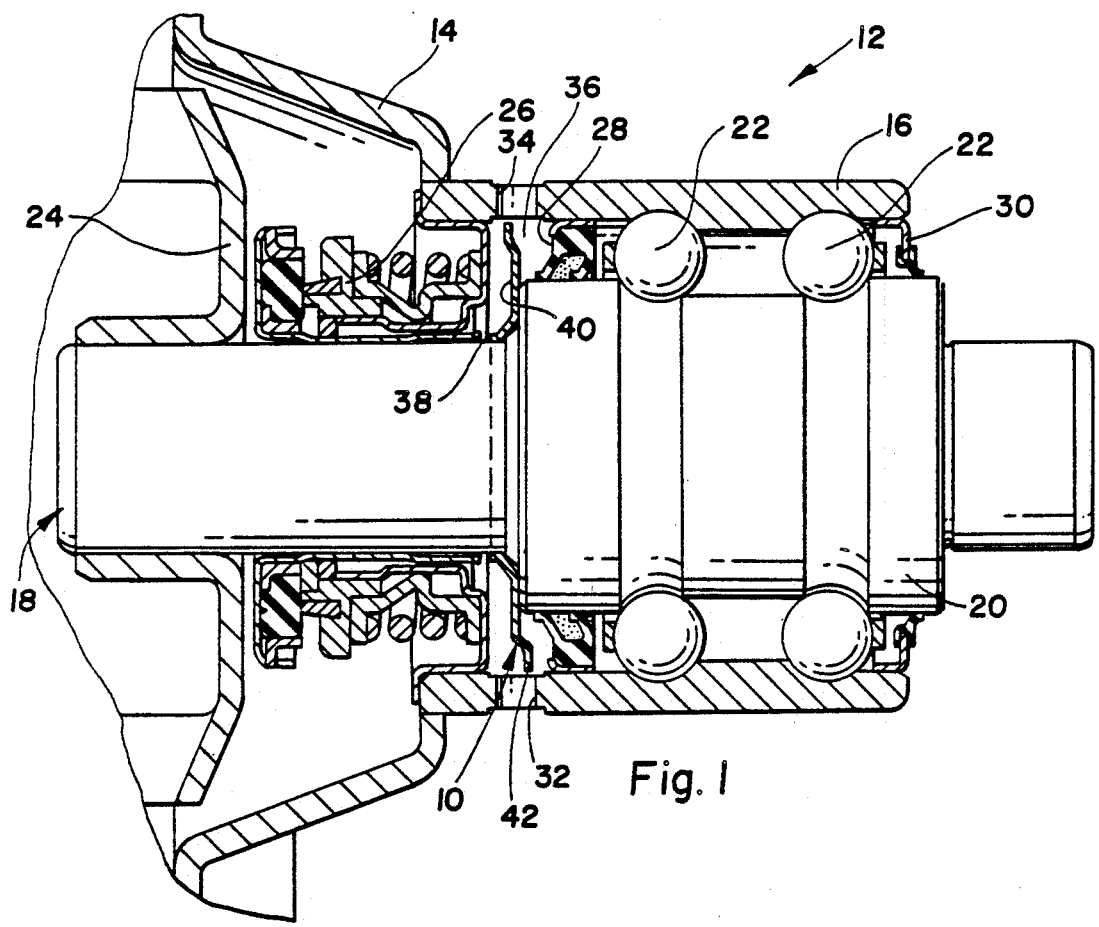
FIG. 1 is a cross sectional view of part of a pump housing and bearing race, showing the pump shaft in elevation, with a cross sectional view of a preferred embodiment of the slinger of the invention mounted to the pump shaft.

Referring first to FIG. 1, a preferred embodiment of the slinger of the invention, indicated generally at 10, is incorporated in a vehicle water pump, indicated generally at 12. Water pump 12 includes a coolant filled pump housing 14 that would be bolted to an engine block, and a cylindrical bearing race 16 that is welded to and protrudes from the front of pump housing 14. Bearing race 16, in effect, serves as part of a larger overall housing, since it is integrally welded to pump housing 14. A pump shaft, indicated generally at 18, runs centrally from pump housing 14 through bearing race 16. Pump shaft 18 is machined with an enlarged solid barrel 20, which fits closely enough within bearing race 16 that a double complement of bearing balls 22 can directly support shaft 18 for rotation within race 16. Shaft 18 is supported solidly, but wi]]inevitably rotate with a slight radial eccentricity relative to the axis of race 16. The inner end of shaft 18 mounts an impeller 24, while the outer end would mount a drive pulley, not shown.

Figure 2:
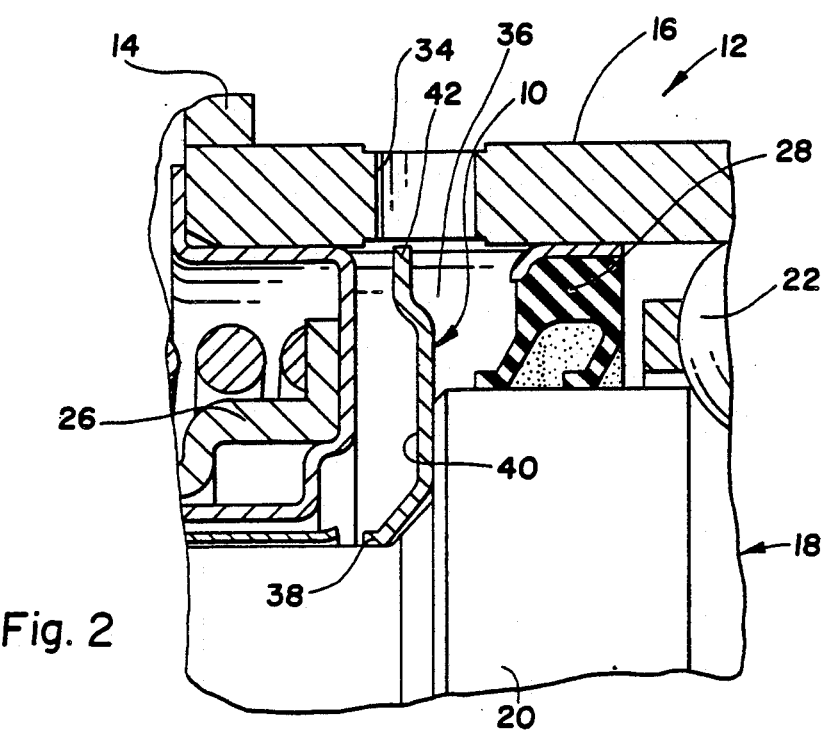
FIG. 2 is an enlarged portion of FIG. 1.

Referring next to FIGS. 1 and 2, it may be seen that shaft 18 is associated with several seals, which perform various different functions. Before entering race 16, shaft 18 passes through a conventional water pump seal 26. Water pump seal 26 serves to retain coolant inside water pump housing 14, but will inevitably pass some coolant. Inside race 16, shaft 18 passes through a pair of bearing seals 28 and 30, which rub near the ends of barrel 20. Bearing seals 28 and 30 retain a supply of lubricant, not shown, around the bearing balls 22, and keep outside contaminants away. The inboard bearing seal 28, which is axially opposed to the pump seal 26, is double lipped, since it has to block any coolant that leaks past the pump seal 26. Outer bearing race 16 includes a pair of diametrically opposed vent holes 32 and 34 axially aligned with the end face of barrel 20, and opening into a chamber 36 that is formed between pump seal 26 and bearing seal 28. Vent holes 32 and 34 provide an escape route for any stray lubricant, as assisted by slinger 10, described next.

Referring next to FIGS. 2 through 4 slinger 10 is secured to pump shaft 18 within chamber 36. Slinger 10 is basically an annular disk, but its shape is more complex than a flat washer. The inner edge of slinger 10 comprises a short cylindrical flange 38 with a diameter closely matching shaft 18. The intermediate portion comprises a flat wall 40 with a diameter slightly greater than shaft barrel 20. The outer edge is a scalloped lip 42 which curves gently from one axial side of a plane represented by flat wall 40 to the other, making three complete undulations. The total axial extent of the undulations of lip 42, measured peak to peak, is indicated at X, and is approximately equal to the diameter of the vent holes 32 and 34. The radius of lip 42 is close to the radius of the inner surface of bearing race 16, but with a clearance that is slightly greater than the running eccentricity of shaft 18 referred to above. These dimensions allow slinger 10 to be installed by pressing flange 38 over shaft 18 until flat wall 40 abuts the end face of barrel 20. After installation, slinger 10 sits in chamber 36, and lip 42 is axially aligned with, and radially close to, the vent holes 34. Any coolant leaking past pump seal 26 into chamber 36 will have only a small radial gap through which it can move past slinger 10 to reach bearing seal 28. If shaft 18 is still, any leaked coolant would naturally run out the lower vent hole 34 before reaching bearing seal 28.

Referring next to FIGS. 2 and 5, when shaft 18 is rotating, lip 42 will run close to, but will not rub on, the inner surface of bearing race 16. Any coolant entering chamber 36 will impinge on the rapidly spinning slinger 10 and will be thrown forcefully radially outwardly, through the vent holes 34. This active shedding of coolant tends to keep it away from bearing seal 28, and will also tend to blow out any contaminants that might have built up in vent holes 32 and 34. Still, a build-up might occur, especially as the result of dust or grit mixing with wet coolant and drying while the vehicle was parked. Such an encrustation might be too solid for the expulsion force of coolant from chamber 36 alone to dislodge. Because of the axial extent X of the undulations noted above, lip 42 will move axially back and forth past and close to the vent holes 32 and 34 as shaft 18 rotates, covering most of their diameter. This will serve to actively scrape away any contaminant encrustation. That physical scraping alone will remove most build up. Any that is not removed should be loosened enough that the force of the coolant expelled from chamber 36 by slinger 10 will remove it. This is especially true in light of the fact that the undulations of the lip 42 will add a rapidly shifting, back and forth axial component to the expelled coolant, acting to continually clear the vent holes 32 and 34.

Variations in the preferred embodiment could be made. More or fewer vent holes could be used. More or fewer undulations could be stamped into lip 42. A slinger like 10 could be applied to a shaft 18 that did not have the enlarged barrel 20. However, the barrel 20, while it's basic purpose is to enlarge shaft 18 enough to allow pathways for balls 22 to be ground directly into it, does conveniently provide an end face perpendicular to the axis of shaft 18 and axially aligned with the vent holes 32 and 34. It thus provides a convenient installation locator and structural support for slinger 10, abutting as it does with the slinger flat wall 38. Therefore, it will be understood that it is not intended to limit the invention to just the embodiment disclosed.

The embodiments of the invention in which an exclusive property or privilege is claimed are defined as follows:

1. For use in a vehicle water pump of the type that has a rotating pump shaft extending axially through a cylindrical housing and through a water pump seal, and in which said housing has at least one vent hole located axially outboard of said seal at a fixed radius relative to said pump shaft, a slinger comprising,
   a cylindrical mounting portion adapted to be secured to said pump shaft in axial alignment with said vent hole, and,
   a circular outer lip having a radius slightly less than said fixed radius, said lip further being scalloped in the axial direction,
   whereby, as said pump shaft rotates, said slinger lip rotates in radial proximity to said vent hole while simultaneously moving axially back and forth past said vent hole.

2. A vehicle water pump, comprising,
   a cylindrical housing,
   a pump shaft rotatably supported coaxially within said cylindrical housing,
   at least one vent hole in said housing located at a fixed radius relative to said pump shaft,
   a water pump seal surrounding said pump shaft axially inboard of said vent hole, and,
   a slinger having a cylindrical mounting portion secured to said pump shaft in axial alignment with said vent hole and a circular outer lip having a radius slightly less than said fixed radius, said lip further being scalloped in the axial direction,
   whereby, as said pump shaft rotates, said slinger lip rotates in radial proximity to said vent hole while simultaneously moving axially back and forth past said vent hole.

* * * * *